United States Patent Office 2,829,344
Patented Apr. 1, 1958

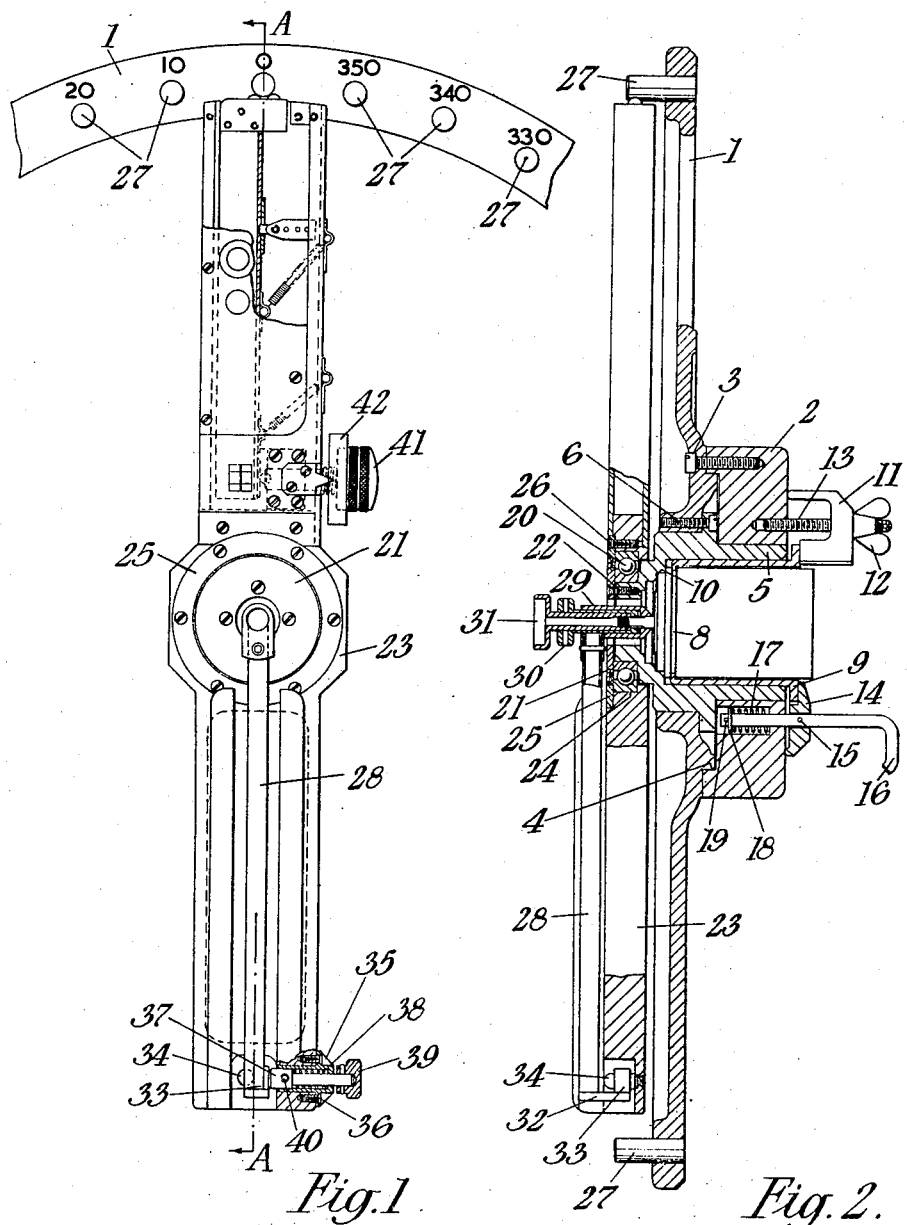

2,829,344

ANGULAR-POSITION, TESTING MEANS FOR ELECTRICAL INSTRUMENTS

Alec E. W. Hibbitt and Norman Geoffrey Arkell, Beckenham, England, assignors to Muirhead & Co. Limited, Beckenham, England Application July 14, 1955, Serial No. 522,131

6 Claims. (Cl. 324—158)

This invention relates to testing means for instruments in which it is necessary to set the angular position of a rotatable member with a high degree of accuracy. It may be applied to the testing of synchros, magslips, resistance potentiometers, inductive potentiometers or any other apparatus in which angular settings of high precision are required.

In U. S. application Serial No. 270,981, now Patent No. 2,726,382, a pointer for a test instrument is described by means of which small departures of the rotor of a synchro (or magslip) from a predetermined angular position may be measured with great accuracy. The pointer is used in conjunction with a dial of suitably large diameter (for example, 18 inches in diameter). This pointer containing a micrometer mechanism is of necessity quite heavy and it is undesirable that so much weight should be carried by the spindle of a small instrument, since this may cause a deflection of the spindle, so introducing a false error.

The present invention consists of an arrangement for setting the angular-positions, of the spindle of an electrical instrument comprising a dial, means for supporting the instrument at the centre of the dial, a pointer supported on bearings for rotation around the dial about the same axis as that of the instrument spindle, a light radius arm for securing to the spindle and means for coupling the arm to the pointer at a point remote from the rotational axis of the instrument.

In this way angular errors due to the coupling are virtually eliminated.

In the description which follows, and the drawings related thereto, a preferred embodiment of the invention is covered, adapted for the angular testing of synchros or magslips, although it will be understood by those skilled in the art how the apparatus may be adapted for the testing of other types of instrument which may be of different size and shape and which may have spindles of different diameters or lengths.

In the accompanying drawings:

Figure 1 shows an elevation of part of a test dial with the pointer, the locating arm, and the method of coupling the locating arm to the pointer.

Figure 2 is a section of the same dial and pointer on the line AA.

In this embodiment a test dial 1 is mounted on a suitable base (not shown) preferably in such a manner that it may be swung out of the vertical and adjusted for convenient manipulation and reading. A bolster 2 is attached to the rear of the dial by screws 3, being located on spigot 4. A flanged housing 5 is also located in the bore of dial 1 and attached thereto by screws 6. A synchro 7 has a circumferential groove 8 near the spindle end of its body and this is engaged by an inward projection at the forward end of a muff 9. Muff 9 is split into two parts along its axis so that the parts may be fitted around the body of synchro 7 before insertion into the tunnel of housing 5. The body of synchro 7 is centrally located within housing 5 by spigot 10 which fits accurately into a corresponding diameter in housing 5. Muff 9 and synchro 7 may be retained within housing 5 by suitable means such as two clamps 11 which are retained by wing nuts 12 on studs 13 screwed into bolster 2. Alternative clamping means may consist of two clamps 14 loosely retained by pins 15 on bars 16 having hooked ends for easy withdrawal against the pressure of springs 17 located by washers 18 and retained by pins 19. To operate the latter type of spring-loaded clamp it is only necessary to pull bar 16 and turn it so that clamp 14 is swung clear of muff 9. By these means the synchro is accurately located and held in its most forward position in relation to housing 5.

A large ball-bearing 20 has its inner race located on an extension of housing 5 and held in position by a clamping plate 21 secured by screws 22. A pointer frame 23 is carried on the outer race of ball-bearing 20, which is located in a stepped bore 24 and secured by clamping plate 25 retained by screws 26. Clamping plates 21 and 25 have overlapping stepped diameters to hinder the ingress of foreign matter. The upper portion of pointer frame 23 may conveniently contain a micrometer pointer according to U. S. Patent application Serial No. 270,981, now Patent No. 2,726,382, co-operating with locating pegs 27, but it may contain other types of pointer suitable for any duties for which the invention is intended, and other means of locating or identifying its position with respect to the dial may be employed.

In the pointer according to the above mentioned patent application the portion which locates on pegs 27 is moveable with respect to the portion fixed to the hub and this relative movement may be controlled and accurately determined by means of a micrometer screw, the indication being given by a pointer against a circular scale frictionally attached to the micrometer screw.

The usual synchro spindle is splined and a screw thread is formed on the end, intersecting the splines. An arm 28, which may conveniently be made of light alloy tubing, is attached to hub 29 the inner portion of which is a close fit on the plain portion of the synchro spindle. A sleeve 30 fits inside hub 29 and its inner end engages the splines on the synchro spindle. Its outer end has a head having a number of radial holes into which a tommy-bar may be fitted. A further sleeve 31 fits inside sleeve 30 and its inner end is internally threaded to fit the thread on the synchro spindle. Its outer end has a head which is fluted or knurled to provide a finger grip. The outer end of arm 28 carries a rearward extension 32 to which is secured a cylindrical peg 33. Another cylindrical peg 34, having its axis at right angles to peg 33, is carried on pointer frame 23. A bracket 35 secured to pointer frame 23 by screws 36 is bored to receive plunger 37. Spring 38 urges plunger 37 inwardly, forcing peg 33 into contact with peg 34. A pin 40 projecting from the side of plunger 37 engages a bayonet groove (not shown) in bracket 38 so that if plunger 37 is withdrawn by knob 39 and turned it will be held in its outer position.

The object of rearward extension 32 is to ensure that the point of contact between peg 33 and peg 34 lies behind the centre line of arm 28 (see Figure 1) and in the plane of the ring of balls in ball bearing 20 (see Figure 2). Thus angular errors due to rocking of the pointer frame about its longitudinal axis, resulting from slight freedom which may exist in the bearing, are reduced to an absolute minimum. The object of coupling arm 28 to pointer frame 23 at a point remote from the axis of rotation is to reduce to a minimum the angular error arising from any eccentricity in the mounting of pointer frame 23 on bearing 20 or in the mounting of arm 28 on the synchro spindle. The spring-loaded engagement between pegs 33 and 34 prevents slackness in the coupling without imposing any side load on the synchro spindle.

Test equipment according to the invention is used for determining the electrical errors at specified angular rotor positions of instruments such as a synchro and the general method according to the known art is to apply the voltage output of the instrument under test to a precision, resistive network. The instrument spindle having been set to a particular angular position, a further small movement is applied in order to secure an exact zero voltage reading across a selected part of the resistive network. The amount by which the instrument rotor has to be moved from its nominal angular position in order to secure the exact zero voltage reading is the angular error of the instrument at the particular nominal angular position.

In testing a synchro the procedure is to insert the synchro with muff 9 into housing 5, locating it by spigot 10 and clamping it into position by means of a clamp as described. Plunger 37 is withdrawn and locked in its outer position, and hub 29 carrying arm 28 is placed on the synchro spindle. Sleeve 30 is inserted and sleeve 31 is screwed in until hub 29 is brought against a shoulder of the synchro spindle but sleeve 31 is not tightened. Plunger 37 is now released so that pegs 33 and 34 are brought into contact and so held by the pressure of spring 38 on plunger 37. A common method of testing a synchro is to connect three resistances of precisely known and equal value in delta arrangement to the three stator windings on the instrument. One of the said resistances has accurate tapping points, so determined that at a particular angular position of the rotor the voltage between a corresponding tap on the tapped resistance and the junction of the two other resistances is zero. A sensitive null detector is connected between this tap on the tapped resistance and the junction of the two resistances. Such null detectors are well known in the electronic art and need no further description.

Assume that the pointer is located at the "0-degree" position shown in Figure 1. By means of a tommy-bar inserted into the head of sleeve 30 the synchro spindle is rotated until the reading of the null detector is as near to zero as possible. Sleeve 31 is tightened and a final adjustment is made by means of the micrometer screw 41 on the pointer to secure an exact zero voltage reading on the null detector. The scale 41 which is frictionally attached to the micrometer screw is then adjusted to read zero.

The synchro spindle may now be moved to other desired angular positions by means of pointer frame 23. At each nominal angular position the flying lead of the null detector is connected to the appropriate tap on the tapped resistance. In the practical case the null detector almost always shows a small voltage and the micrometer screw is adjusted to impart a further slight angular movement to the synchro spindle until an exact zero reading is obtained. The reading of the micrometer scale then shows the angular error of the synchro at the particular nominal angular position.

It will be evident to those skilled in the art that hub 29 and sleeves 30 and 31 may be replaced by means for securing arm 28 to other types of instrument spindle and it will also be clear how the technique above described may be applied to the testing of other instruments. It will be evident that variations in the general form of the apparatus may be made without departing from the scope of the invention.

We claim:

1. Testing apparatus for determining the angular errors of electrical instruments having a rotatable part comprising a dial, means for supporting an instrument to be tested at the centre of said dial, a pointer supported on a bearing for rotation around said dial on an axis coincident with the axis of rotation of the spindle of said instrument, a light radius arm for securing to said spindle and means for coupling said arm to said pointer at a point remote from said axis of rotation, whereby the mechanical load on said spindle is substantially limited to the weight of said arm and the angular error due to said coupling means is reduced to a minimum.

2. Testing apparatus as claimed in claim 1, in which the engagement of the arm and pointer is in a plane perpendicular to the axis of rotation and passing through the centre of the pointer bearing.

3. Testing apparatus as claimed in claim 1, in which the engagement of the arm and pointer is effected by two cylindrical pegs with their axes at right angles.

4. Testing apparatus as claimed in claim 3, in which the pegs are forced together by means of a retractable spring-loaded plunger.

5. Testing apparatus as claimed in claim 1, in which the supporting means for the instrument comprise a flanged housing located in a bore at the centre of the dial and a bolster attached to the rear of the dial and surrounding the housing.

6. Testing apparatus as claimed in claim 1, in which the pointer extends in both directions from the axis of rotation, one arm of the pointer being adapted for securing to the dial and the other arm being used for securing to the light arm.

References Cited in the file of this patent
UNITED STATES PATENTS
2,726,382    Bell _____ Dec. 6, 1955